(12) United States Patent
Shimizu et al.

(10) Patent No.: US 9,106,213 B2
(45) Date of Patent: Aug. 11, 2015

(54) BIT GENERATION APPARATUS AND BIT GENERATION METHOD

(75) Inventors: Koichi Shimizu, Tokyo (JP); Daisuke Suzuki, Tokyo (JP); Tomomi Kasuya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 13/978,598

(22) PCT Filed: Jan. 13, 2011

(86) PCT No.: PCT/JP2011/050385
§ 371 (c)(1),
(2), (4) Date: Jul. 8, 2013

(87) PCT Pub. No.: WO2012/095972
PCT Pub. Date: Jul. 19, 2012

(65) Prior Publication Data
US 2013/0293274 A1 Nov. 7, 2013

(51) Int. Cl.
*H03K 9/08* (2006.01)
*H03K 3/02* (2006.01)
*H03K 5/1252* (2006.01)
*H04L 9/32* (2006.01)
*H03K 19/003* (2006.01)

(52) U.S. Cl.
CPC ............... *H03K 3/02* (2013.01); *H03K 5/1252* (2013.01); *H03K 19/003* (2013.01); *H04L 9/3278* (2013.01); *H03K 19/00361* (2013.01)

(58) Field of Classification Search
None
See application file for complete search history.

(56) References Cited

U.S. PATENT DOCUMENTS

| 6,588,672 B1 | 7/2003 | Usami |
| 6,741,657 B1 * | 5/2004 | Hoelzle .......................... 375/256 |
| 2007/0250938 A1 | 10/2007 | Suh et al. |
| 2007/0279503 A1 * | 12/2007 | Totsuka ........................ 348/283 |

(Continued)

FOREIGN PATENT DOCUMENTS

| JP | 2002-171295 A | 6/2002 |
| JP | 2008 176578 | 7/2008 |

(Continued)

OTHER PUBLICATIONS

Suzuki, D., et al., "The Glitch PUF: A New Delay-PUF Architecture Exploiting Glitch Shapes", CHES 2010, LNCS 6225, Total 18 pages, (Aug. 2010).

(Continued)

*Primary Examiner* — Tuan T Lam
(74) *Attorney, Agent, or Firm* — Oblon, McClelland, Maier & Neustadt, L.L.P.

(57) ABSTRACT

A bit generation apparatus includes a glitch generation circuit that generates glitch signals which include a plurality of pulses, and T-FF bit generation circuits which input the glitch signals, and based on either rising edges or falling edges of the plurality of pulses included in the glitch signals, generate a bit value of either 0 or 1. Each of the T-FF bit generation circuits generates a respective bit value based on either the parity of the number of rising edges or the parity of the number of falling edges of the plurality of pulses. As a result of employment of the T-FF bit generation circuits, circuits that are conventionally required but not essential for the glitch become unnecessary. This serves to prevent expansion in circuit scale and increase in processing time of bit generation for the bit generation circuit.

8 Claims, 18 Drawing Sheets

(56) References Cited

U.S. PATENT DOCUMENTS

| | | |
|---|---|---|
| 2009/0265758 A1 | 10/2009 | Tuyls |
| 2010/0070777 A1 | 3/2010 | Salters et al. |
| 2012/0033810 A1* | 2/2012 | Devadas et al. ............ 380/46 |
| 2012/0293354 A1* | 11/2012 | Suzuki ................. 341/173 |

FOREIGN PATENT DOCUMENTS

| | | |
|---|---|---|
| JP | 2008 191939 | 8/2008 |
| JP | 2009 524998 | 7/2009 |
| JP | 2009 533741 | 9/2009 |
| JP | 2009 533927 | 9/2009 |
| KR | 10-2010-0088126 A | 8/2010 |
| WO | 99 08192 | 2/1999 |
| WO | WO 2009/030997 A2 | 3/2009 |

OTHER PUBLICATIONS

Matsumoto, K., et al., "Evaluation of Stateful TMR", IPSJ SIG Notes, pp. 1 to 6, (Nov. 27, 2009).

Majzoobi, M., et al., "Techniques for Design and Implementation of Secure Reconfigurable PUFs", ACM Transactions on Reconfigurable Technology and Systems, vol. 2, No. 1, Article 5, Total 33 pages, (Mar. 2009).

Suzuki, D., et al., "The Glitch PUF: A New Delay-PUF Architecture Expliting Glitch Shapes", URL: http://www.iarch.org/workshops/ches/ches2010/presentations/CHES2010_Session08_Talk03.pdf, (2010).

Suzuki, D., et al. "Generations of Device Unique Keys, Exploiting Amorphous Glitches (1)", SCIS 2010, Total 7 Pages, (Jan. 19, 2010).

Shimizu, K., et al., "An Improved Glitch Puf", SCIS 2011, Total 7 Pages, (Jan. 25-28, 2010).

Anderson, J.H., "A PUF Design for Secure FPGA-Based Embedded Systems", Proc. of The IEEE/ACM Asia and South Pacific Design Automation Conference, pp. 1-6, (2010).

International Search Report Issued Feb. 15, 2011 in PCT/JP11/050385 Filed Jan. 13, 2011.

Office Action issued Nov. 5, 2013, in Japanese Patent Application No. 2012-552573 (with English-language translation).

Office Action issued Oct. 27, 2014 in Korean Patent Application No. 10-2013-7018145 (with English language translation).

Office Action issued Feb. 27, 2015 in Chinese Patent Application No. 201180064824.X (with English translation).

\* cited by examiner

T-FF(131(1),131(1)-1)

BIT GENERATION APPARATUS AND BIT GENERATION METHOD

TECHNICAL FIELD

The present invention relates to a security apparatus that performs authentication, encryption and the like. For example, the present invention relates to an apparatus that generates secret information for encryption and device unique identifiers required for device authentication, based on device unique physical amounts.

BACKGROUND ART

As for semi-conductor devices on ASIC (Application Specific Integrated Circuit) or FPGA (Field Programmable Gate Array), there is a phenomenon that different outputs are obtained from devices of the same kind on which the same circuits are mounted because each device has different device characteristics such as gate delays. A circuit that produces such a phenomenon and its technology are called Physical Unclonable Function and Physical Uncloning Technique (hereafter, referred to as PUF) or the like. PUF is expected to be applied to authentication, encryption and such.

Non-patent literature 1 describes an example of PUF. In Non-Patent Literature 1, a glitch which occurs in an output signal in a combination circuit is exploited. FIGS. 14 and 15 illustrate the principle of the PUF (referred to as glitch PUF) in Non-Patent Literature 1. The glitch PUF of Non-Patent Literature 1 is discussed with reference to FIGS. 14 and 15. A glitch is a phenomenon that the value of a signal repeatedly changes between 0 and 1 before the signal settles to its intended value. Referring to FIG. 14, when the values of input signals x1 to xL to a random logic 201 in a combination circuit are varied, the values of output signals y1 to yM (and the value of a signal g selected from among the output signals) change accordingly. Such a change does not occur instantly, but takes a certain period of time. In a transitional state of the change, a glitch in which a value repeatedly changes between 0 and 1 occurs, as shown in an area 202.

The glitch shape is determined by delays in gates in the random logic 201. Gate delays vary from device to device, and therefore the glitch shape differs depending on the device. Therefore, by allocating the glitch shape to 0 or 1, a device unique information bit can be generated. Non-patent Literature 1 describes a method of converting the parity of the number of pulses included in a glitch into a bit, as shown in (a) and (b) in FIG. 15. That is the principle of the glitch PUF.

Referring to Non-Patent Literature 1, to acquire the glitch shape, a signal (hereafter, referred to as glitch signal) including a glitch is sampled to acquire a waveform (hereafter, referred to as glitch waveform) including the glitch. A glitch is a phenomenon occurring in a shorter period of time than a clock cycle. For this reason, the following process is required:
(a) one glitch signal is sampled by slightly phase-shifted N clocks; or
(b) slight-delay added N glitch signals are sampled by one clock.

The "slight delay" is a period of time (delay) that is shorter than the interval between pulses included in a glitch. Non-Patent Literature 1 is based on the latter (b) (FIG. 16). Non-Patent Literature 1 also proposes a method of using wires for carry bits in an adder circuit in which delay is suppressed to a minimum, on LSI such as FPGA, as a method of adding the "slight delay".

CITATION LIST

Non-Patent Literature

Non-Patent Literature 1: Daisuke Suzuki et al., "Device Unique Key Generation Method Exploiting Glitch Shapes"

SUMMARY OF INVENTION

Technical Problem

The acquisition of a glitch waveform by sampling described in Non-Patent Literature 1 requires circuits which are not essential for the glitch PUF. This poses a problem of expansion in circuit scale and increase in processing time. This results in another problem that the number of simultaneously generable bits is reduced.

The cause of the problems is discussed below. FIG. 16 shows that a delay circuit 203 for sampling generates slight-delay added N signals s1 to sN. As shown in FIG. 17 (N=6), it is ideal that the signals s1 to sN are sampled in the same order in which the delays are added, and then the original waveforms of the signals are reproduced from the sampling results. In practice, however, delays caused by wires through which the signals s1 to sN travel to reach sampling registers 204, or by clock skew of a sampling clock CLK may be greater than the slight delay added by the delay circuit 203 for sampling, in FIG. 16s. As a result, as shown in FIG. 18, sampling is done in a state where inversions occur in the order in which the delays are added, which poses a problem of a failure to reproduce the original waveforms.

In order to solve this problem, in Non-Patent Literature 1, a series of different-timing pulses are sampled, an order relation of the inverted order is learned from the sampling results, and then sorting is performed, as a preprocessing of PUF. FIG. 19 shows the configuration of a bit sequence generation circuit 401 in Non-Patent Literature 1. A messenger signal delay circuit 402 is a circuit for generating the different-timing pulses. A selector 403 is needed for selecting a pulse and a glitch signal to be used for PUF processing. A delay circuit 404 for sampling and a sampling register 405, which have no relation directly to the glitch PUF, are required. A variable delay circuit 406 is required for adjusting the timing for sampling. Only one bit can be generated at a time by the messenger signal delay circuit 402 through the variable delay circuit 406, and a glitch shape determination circuit 407. In principle, multiple bits can be generated simultaneously by a parallel arrangement of the messenger signal delay circuit 402 through the glitch shape determination circuit 407. In practice, however, there is a problem of expansion in circuit scale.

An object of the present invention is to provide a bit generation apparatus whose circuit scale is reduced, processing time is reduced, and the number of simultaneously generable bits is increased. The bit generation apparatus is achieved by generating information bits based on glitch waveform shapes in the glitch PUF, with no sampling and sorting of glitch signals involved.

Solution to Problem

A bit generation apparatus according to this invention includes:
a glitch generation section that generates a glitch signal including a plurality of pulses; and
a bit value generation section that inputs the glitch signal generated by the glitch generation section, and generates a bit value of 0 or 1 based on rising edges or falling edges of the plurality of pulses included in the inputted glitch signal.

Advantageous Effects of Invention

The present invention allows circuits that are conventionally required but not essential for the glitch PUF to be made redundant, thereby preventing expansion in circuit scale and increase in processing time. As a result, the problem of reduction in the number of simultaneously generable bits can be solved as well.

DESCRIPTION OF EMBODIMENTS

Embodiment 1

Figure 1:
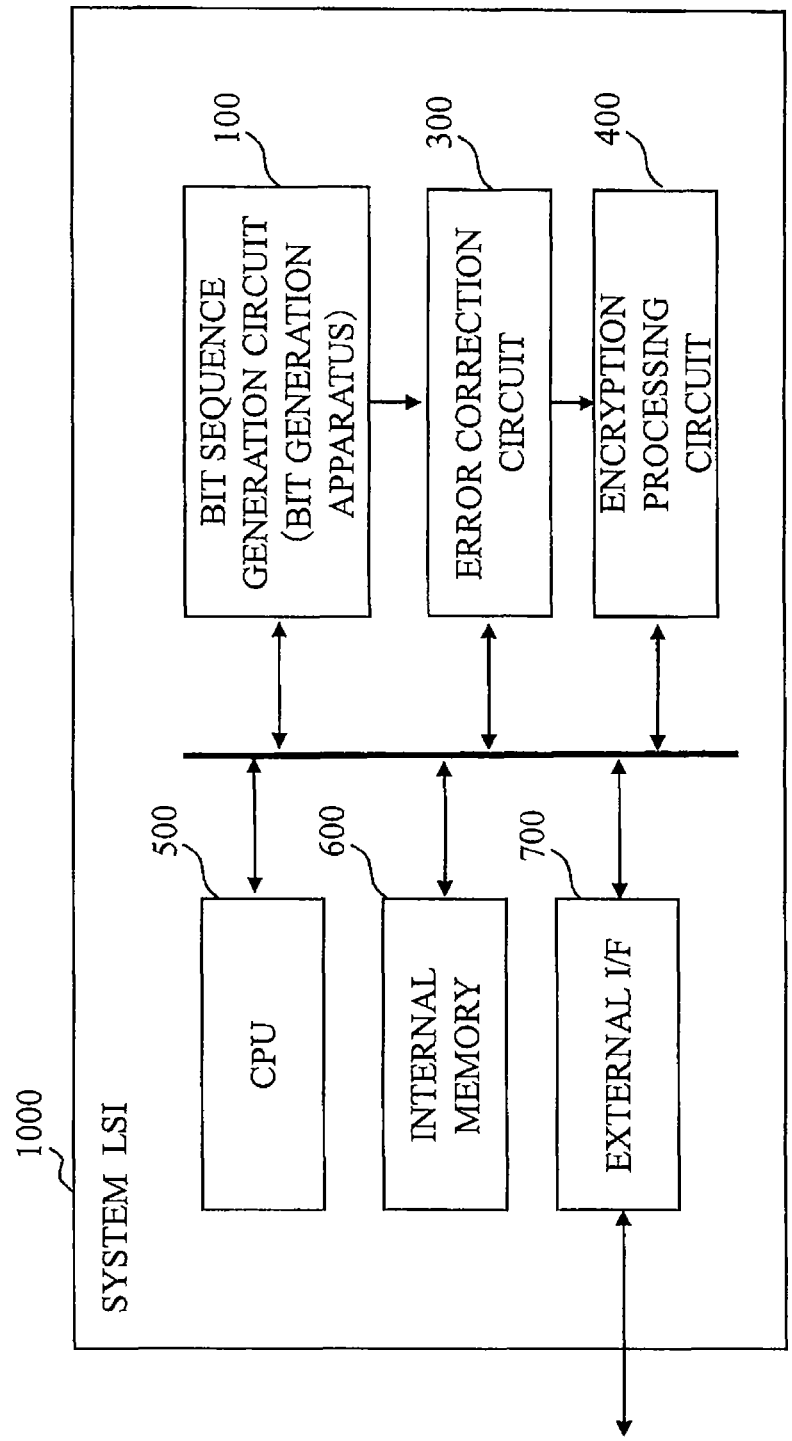
FIG. 1 shows an example of a bit sequence generation circuit 100 mounted on a system LSI, according to a first embodiment.
Figure 9:
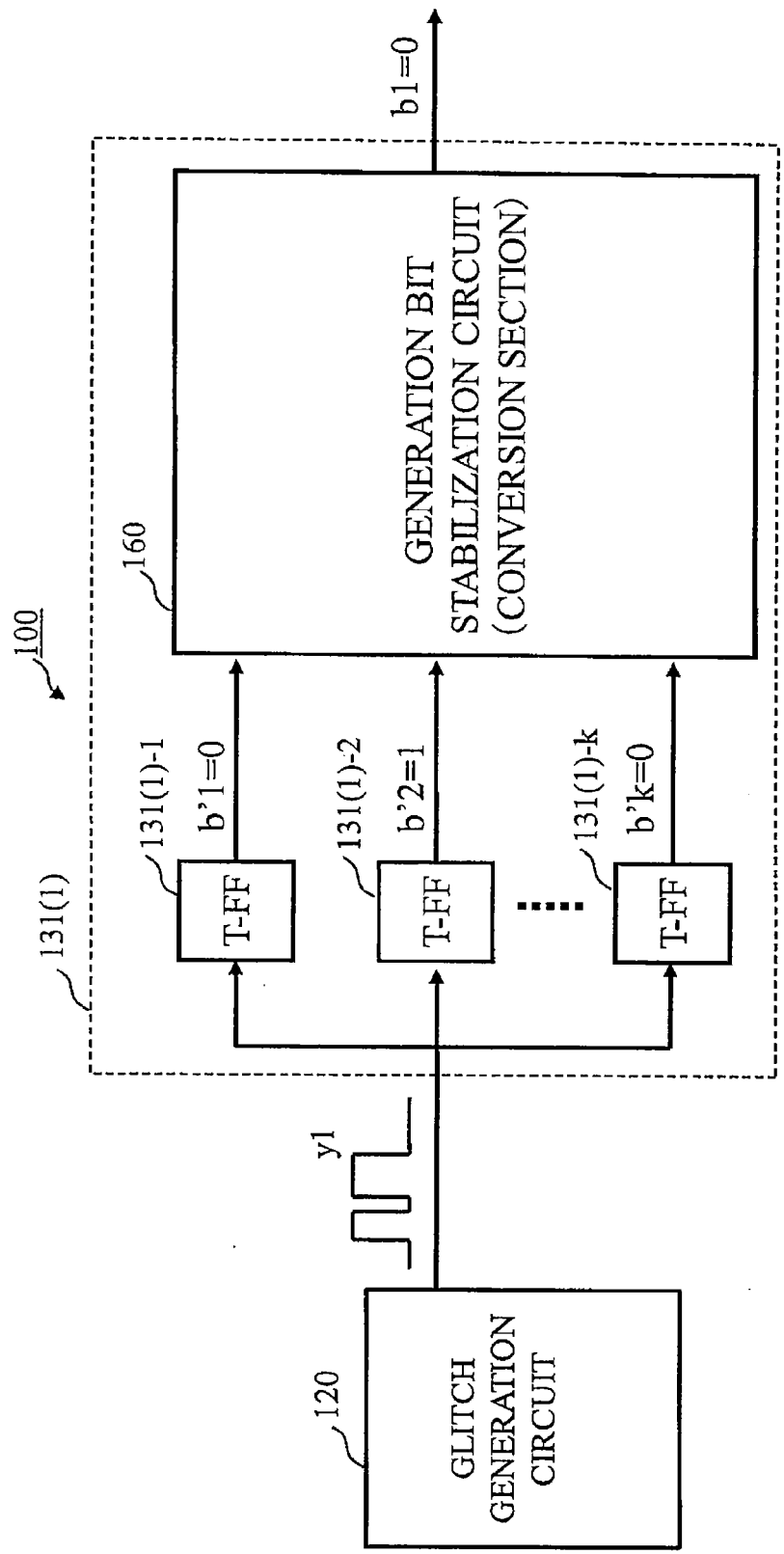
FIG. 9 shows a configuration of a T-FF bit generation circuit 131(1) including a plurality of T-FFs and a generation bit stabilization circuit 160, according to the first embodiment.

FIG. 1 shows an example of a bit sequence generation circuit 100 (bit generation apparatus) mounted on a system LSI (large scale integration) 1000. FIG. 1 illustrates an example where the bit sequence generation circuit 100, an error correction circuit 300 (error correction section), and an encryption processing circuit 400 are mounted on a system LSI which has a common structure including a CPU (central processing unit) 500, an internal memory 600 (example of storage unit), an external interface 700 and such. The bit sequence generation circuit 100 generates a bit sequence based on a glitch signal, which is discussed below. Specifically, the bit sequence generation circuit 100 performs a parallel processing to generate a plurality of bit values, and generates key information or device identification information as a bit sequence, based on the plurality of generated bit values. The key information or the like is a glitch PUF. Data (bit sequence) generated by the bit sequence generation circuit 100 is used as key information necessary for information security processing such as encryption processing performed by the encryption processing circuit 400, for example. The bit sequence generation circuit 100 may be controllable by the CPU 500. The bit sequence generation circuit 100 (generation bit stabilization circuit 160) includes a processing of promoting stability of generation bits as discussed later (FIG. 9). It is however still difficult to eliminate an error included in a generated bit sequence. In FIG. 1, such an error is corrected by the error correction circuit 300. The use of the error correction circuit 300 allows device unique information generated by the bit sequence generation circuit 100, to be used as key information necessary for encryption processing.

The bit generation circuit 100 is characterized in that the odd or even (parity) of the number of pulses included in a glitch signal is determined based on the number of times of bit inversions. For the determination of parity of a glitch signal, a circuit called toggle flip-flop (represented by T-FF) is used.

Figure 2:
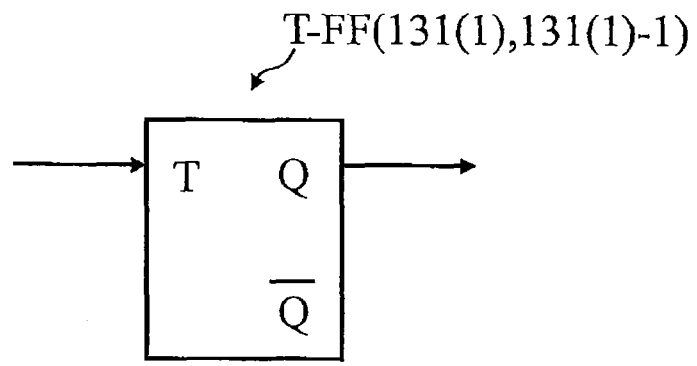
FIG. 2 shows a T-FF according to the first embodiment.

FIG. 2 shows a T-FF (example of a unit circuit discussed later). The T-FF is a sequential circuit represented by circuit symbols such as those shown in FIG. 2.

Figure 3:
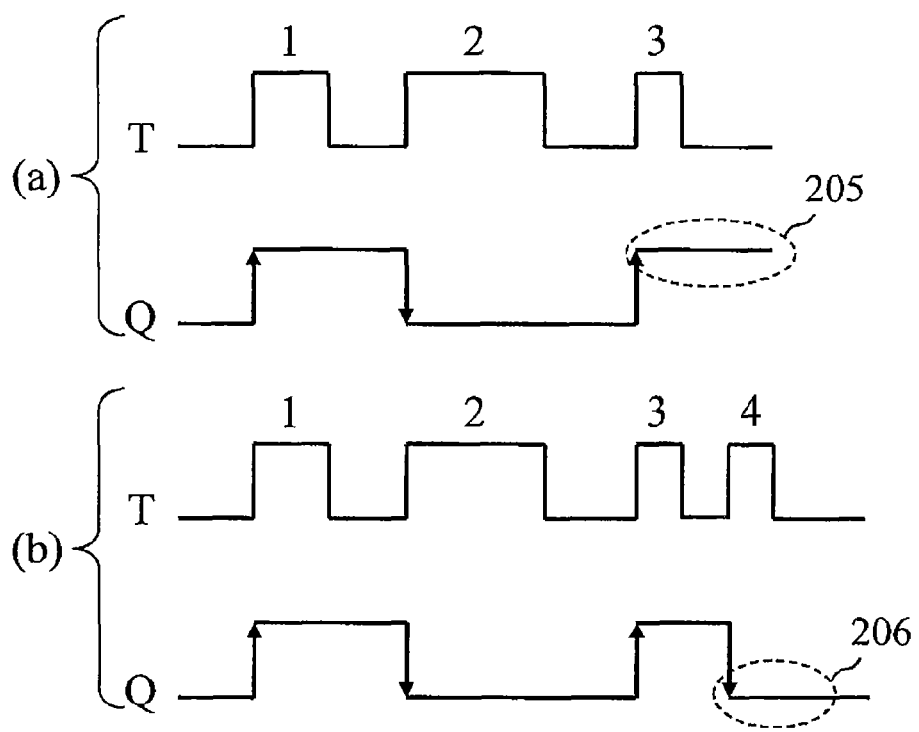
FIG. 3 shows input signals T and output signals Q of the T-FF, according to the first embodiment.

FIG. 3 shows input signals T and output signals Q of the T-FF in FIG. 2. Referring to FIG. 3, (a) shows when a glitch signal includes three (odd number) pulses, and (b) shows when a glitch signal includes four (even number) pulses. The T-FF is a flip-flop in which the value of the output signal Q is inverted once every time the input signal T rises. As a result, as shown in FIG. 3, a final value of the output Q is determined by whether the number of pulses of the input T is even or odd. In accordance with this principle, a glitch signal is inputted as the input signal T of the T-FF and the resultant output signal Q is utilized, thereby implementing the glitch PUF. Specifically, referring to (a) in FIG. 3, the input signal T has three (odd number) pulses. In the T-FF, every time a rising edge of a pulse is detected, the value of the output signal Q is inverted. Thus, as indicated in a dotted-line area 205 in (a) in FIG. 3, when the input signal T has three (odd number) pulses, the "final value of the output signal Q" is high level. When the input signal T has four (even number) pulses, the "final value of the output signal Q" is low level, as indicated in a dotted-line area 206 in (b) in FIG. 3.

Accordingly the bit is determined as follows:

"Final value of output signal Q is high level" (pulse number is odd)=Bit value "0", and "Final value of output signal Q is low level" (pulse number is even)=Bit value "1".

If the initial signal level of the output Q is "high level" in FIG. 3, then:

"Final value of output signal Q is low level" (pulse number is odd)=Bit value "0"; and "Final value of output signal Q is high level" (pulse number is even)=Bit value "1".

Thus, the number of times of inversion of the output Q (final value of output Q) corresponds to the parity of the pulses. Therefore, the bit value can be determined based on the final value of the output signal Q. With reference to FIG. 3, a description has been given of the T-FF detecting the rising edges of the pulses of the input signal T (glitch signal), but it is apparent that the falling edges can be alternatively detected.

(Configuration of Bit Sequence Generation Circuit 100)

Figure 4:
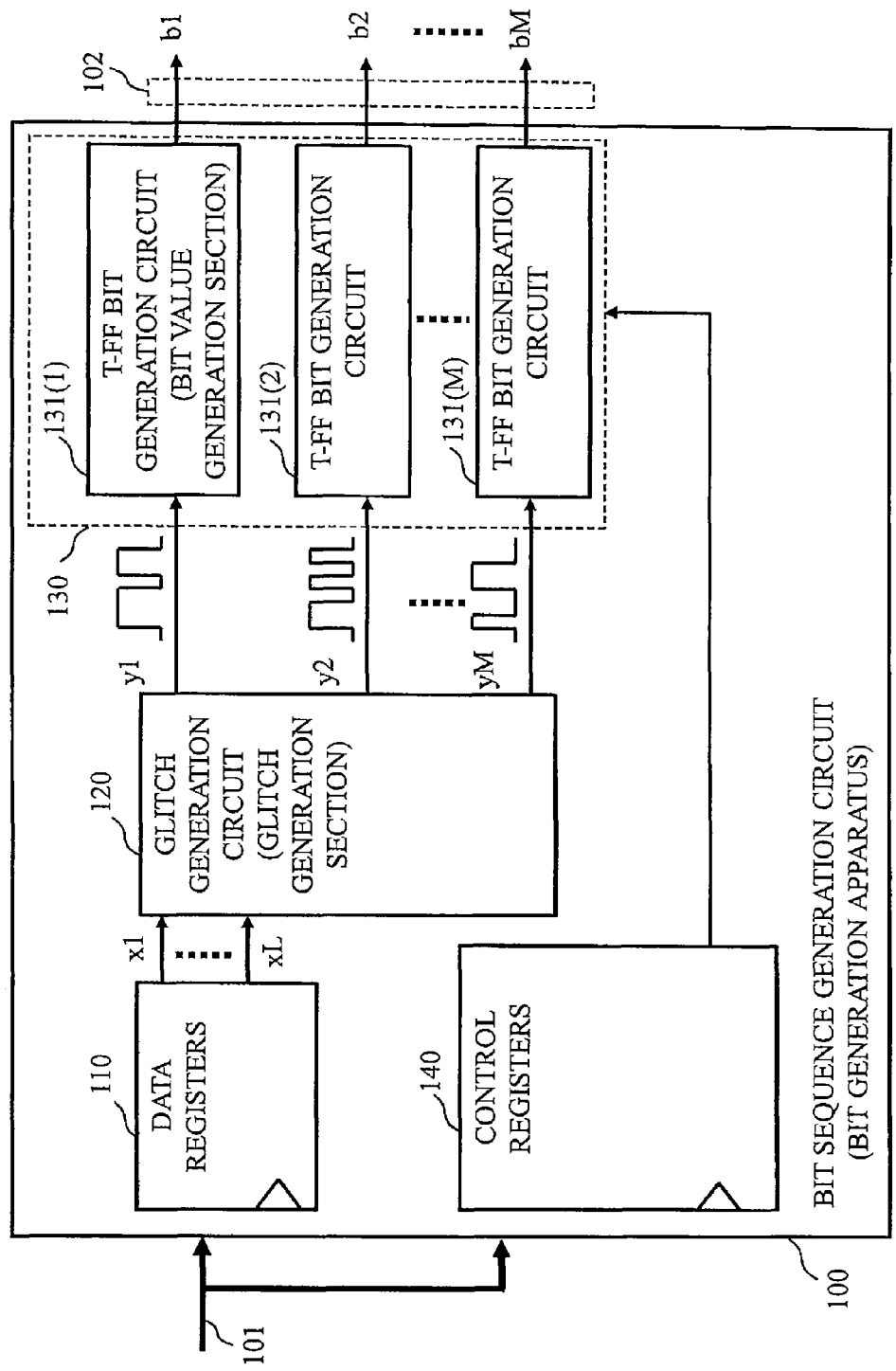
FIG. 4 shows a block diagram of the bit sequence generation circuit 100 according to the first embodiment.

FIG. 4 show a block diagram of the bit sequence generation circuit 100. The bit sequence generation circuit 100 is designed to generate an information bit sequence which is unique to each device. The bit sequence generation circuit 100 is connected to data buses 101 and 102. The bit sequence generation circuit 100 includes data registers 110, a glitch generation circuit 120 (glitch generation section), bit generation circuits 130, and control registers 140. The bit generation circuits 130 include M of T-FF bit generation circuits 131 (bit value generation sections) based on T-FF. The T-FF bit generation circuits 130 are represented each as a T-FF bit generation circuit 131(i) (i=1 to M) to distinguish them from one another. For example, a T-FF bit generation circuit 131(1) inputs a glitch signal y1 and outputs a bit b1. The T-FF bit generation circuit 131(1) may be a unit circuit composed of a single T-FF which will be discussed later, or a plurality of unit circuits as discussed later with reference to FIG. 9.

The data registers 110 include registers that hold input signals "x1 to xL" to the glitch generation circuit 120, upon input of data from the data bus 101.

The glitch generation circuit 120 inputs the data signals x1 to xL and returns (outputs) signals y1 to yM.

Figure 5:
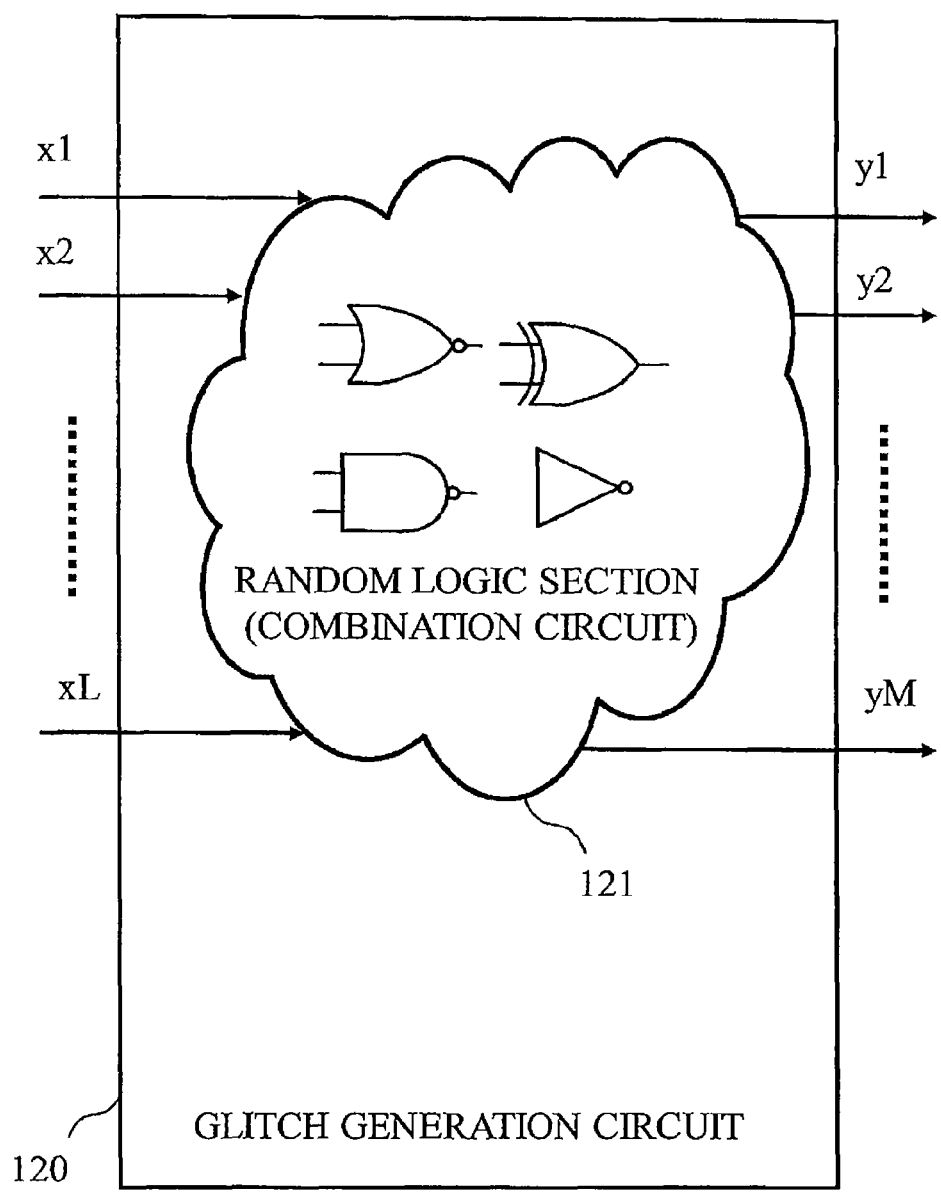
FIG. 5 shows an internal configuration of a glitch generation circuit 120 according to the first embodiment.

FIG. 5 shows an internal configuration of the glitch generation circuit 120. The glitch generation circuit 120 includes a random logic section 121 (combination circuit). The random logic section 121 processes the inputs of L bits, x1 to xL, by a combination circuit of arbitrary functions, and outputs the data of M bits, y1 to yM. AES S-box defined in symmetric-key cryptography is given as an example of function used for processing in the random logic section 121. In the case of S-box, L=M=8.

The bit generation circuits 130 are composed of M of the T-FF bit generation circuits 131 which input the outputs y1 to yM from the glitch generation circuit 120, as inputs T, and generate and output bits b1 to bM corresponding to the input signals y1 to yM. Specifically, as shown in FIG. 4:

a T-FF bit generation circuit 131(1) inputs the input signal y1 and outputs the value b1;

a T-FF bit generation circuit 131(2) inputs an input signal y2 and outputs a value b2; and in the same manner, a T-FF bit generation circuit 131(M) inputs the input signal yM and outputs the value bM.

Figure 6:
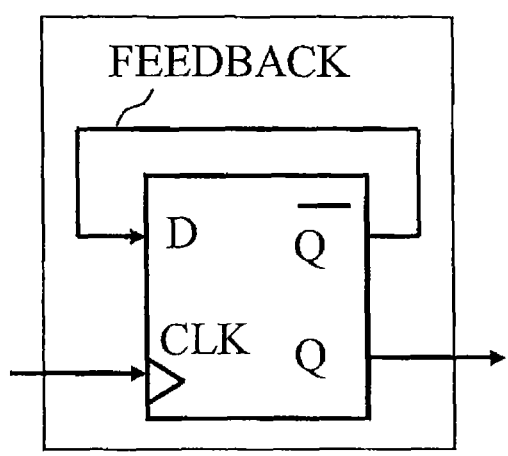
FIG. 6 shows a configuration of a T-FF on ASIC, which uses D flip-flop, according to the first embodiment.
Figure 7:
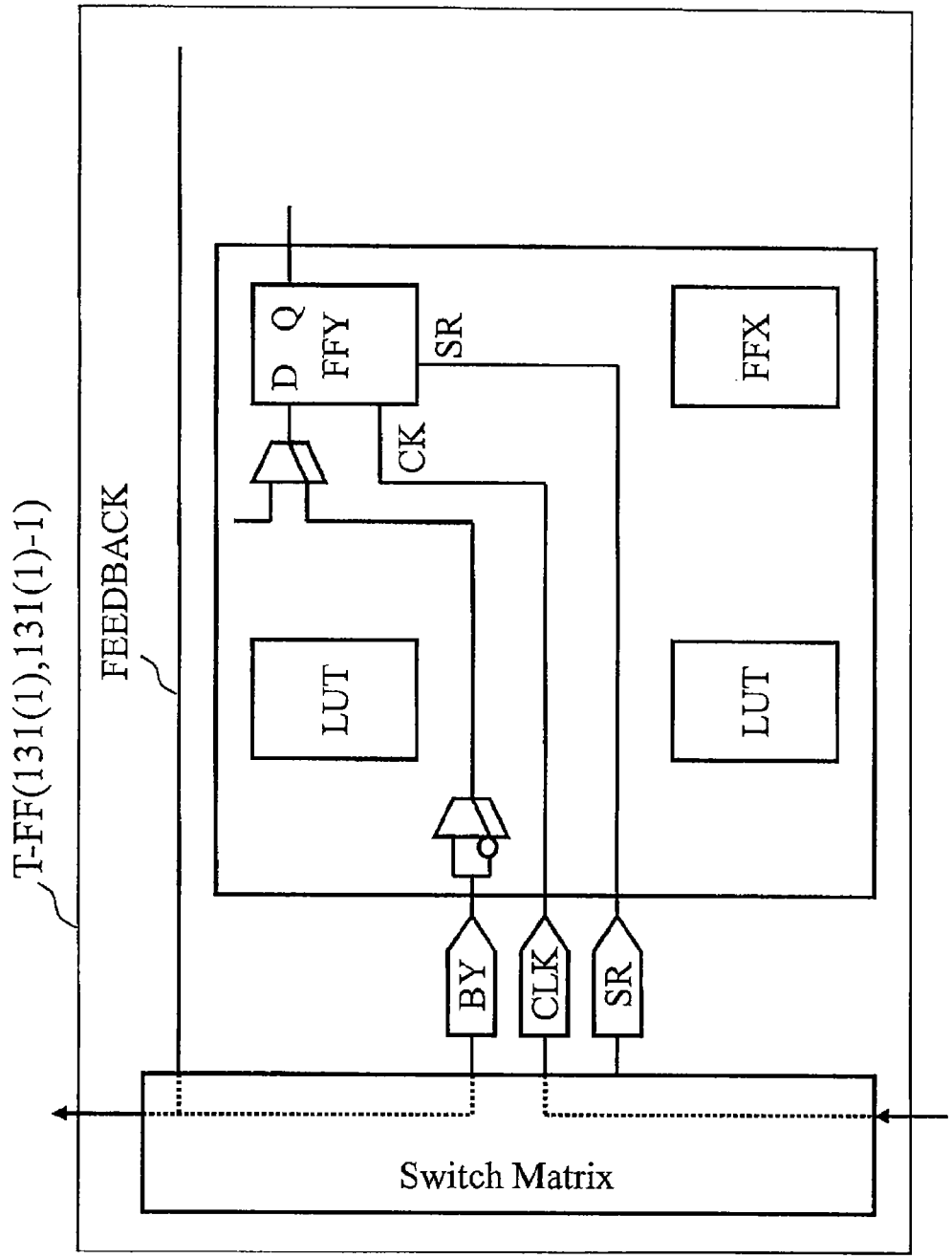
FIG. 7 shows a configuration of an F-FF on FPGA, according to the first embodiment.

FIGS. 6 and 7 illustrate examples of the configuration on LSI of the T-FF described with reference to FIG. 2.

FIG. 6 shows a configuration of a T-FF on ASIC, using a common D flip-flop.

The T-FF in FIG. 6 inputs an inverted output by the D flip-flop, after a feedback. The T-FF in FIG. 6 and the T-FF in FIG. 7 correspond to the T-FF bit generation circuit 131(1) when it is a unit circuit, or a T-FF bit generation circuit 131(1)-1 as a unit circuit.

The T-FF in FIG. 7 illustrates an example of the configuration of an F-FF on FPGA. An FPGA usually includes a plurality of components, each component being a pair of an LUT (Look Up Table) for implementing a logic function, and a register for holding an output from the LUT. The plurality of components can be wired together. FIG. 7 shows an FPGA Series called Xilinx Spartan-3A as an example. The FPGA in FIG. 7 includes a component called a slice which has two pairs of LUTs and registers, and a component called a switch matrix for wiring between slices or between a slice and another component such as a RAM. One register is used in one slice, and a resultant output is inputted to the same slice again by wiring by the switch matrix, and then inputted to the same register via an inversion route within the slice, which composes the T-FF in FIG. 7. If the LUT is used in the inversion process, thereby including the LUT in the wire, for example, the inversion process cannot catch up with the generation of pulses in the glitch signal. This may cause timing violation. Accordingly, the LUT is not to be used in the inversion process.

An internal configuration of the bit generation circuits 130 is discussed in detail with reference to FIGS. 8 to 11.

Figure 8:
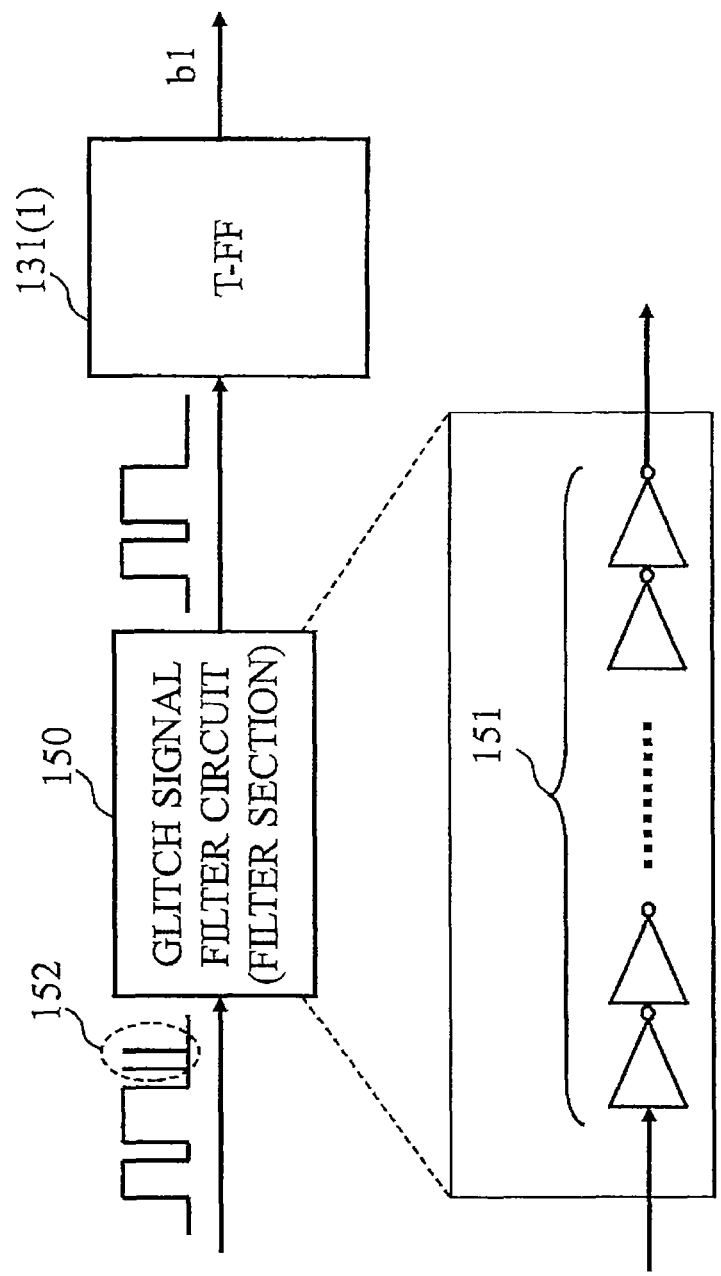
FIG. 8 shows a filter circuit 150 provided before a T-FF, according to the first embodiment.

FIG. 8 shows a configuration including a filter circuit 150 (filter section) for glitch signals, before the T-FF. Pulses in the glitch signals (signals y1 to yM in FIG. 4) may include a pulse whose width is extremely narrow, like a pulse enclosed in a dotted line 152 in FIG. 8, for example. This type of pulse may disappear when passing through a gate, or cause a delay in a feedback input because the latching period is too short, in the T-FF in FIGS. 6 and 7, and others. This can be a cause of making the bit generation unstable. Accordingly, in order to stabilize the bit generation, the filter circuit 150 is placed before the T-FF for removing the pulse whose width is extremely narrow. FIG. 8 shows a filter circuit 151 which is configured to connect inverters in series, as a specific configuration of the filter circuit 150.

FIG. 9 shows a configuration in which a glitch signal (e.g., signal y1) is divided and inputted to each T-FF. FIG. 9 illustrates the T-FF bit generation circuit 131(1) in FIG. 4 when including K of the T-FF bit generation circuits and a generation bit stabilization circuit 160 (conversion section). The K T-FF bit generation circuits in FIG. 9 are represented as T-FF bit generation circuits 131(1)-1 to 131(1)-K. Hereafter, each of the T-FF bit generation circuits 131(1)-1 to 131(1)-K is referred to also as a "unit circuit". The "unit circuit" (bit value generation section) is a circuit that inputs one glitch signal such as the signal y1, and outputs one bit. The same configuration as that of the T-FF bit generation circuit 131(1) is applied to each of the T-FF bit generation circuits 131(2) to the T-FF bit generation circuit 131(M). With the same glitch signal y1, generated bits b1 may vary depending on the unit circuit. In other words, if the bit value b1 is generated by a single unit circuit alone for the glitch signal y1, the generated bit value b1 is likely to be unstable. That is, if the T-FF bit generation circuit 131(1) in FIG. 4 is assumed to be the only unit circuit, outputted bit values b1 are likely to be unstable. Accordingly, as shown in FIG. 9, the T-FF bit generation circuit 131(1) is configured to include the K unit circuits and the generation bit stabilization circuit 160. Referring to FIG. 9, each of the unit circuits inputs the glitch signal y1 generated by the glitch generation circuit 120 via a respective different signal line, and output a bit value b'i (i=1-K). The generation bit stabilization circuit 160 converts the K bit values into the representative bit value indicating a value of either 0 or 1, based on the number of 0s and 1s indicated by the K bit values generated by the respective unit circuits. FIG. 9 shows when the generation bit stabilization circuit 160 has converted the K bit values into the representative bit value "b1=0". Thus, the generation bit stabilization circuit 160 is a circuit for stabilizing the bit value bi (i=1-M) generated based on the glitch signal yi (i=1-M).

Figure 10:
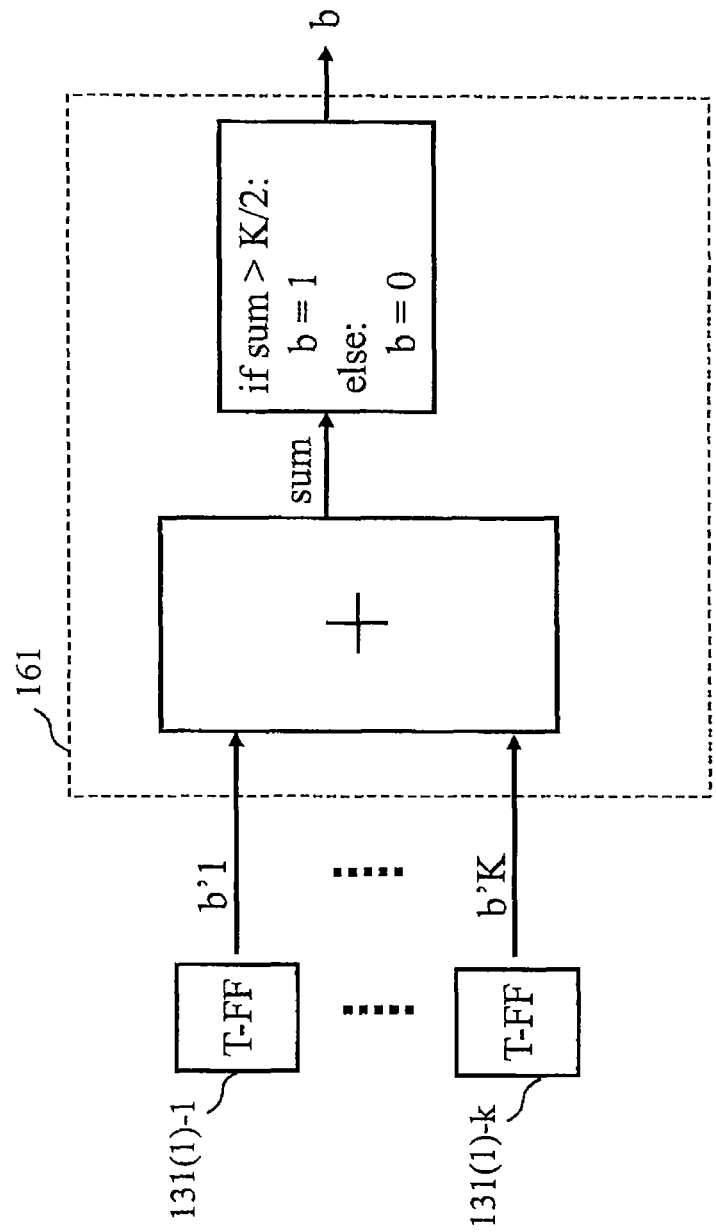
FIG. 10 shows a specific configuration of the generation bit stabilization circuit 160 according to the first embodiment.
Figure 11:
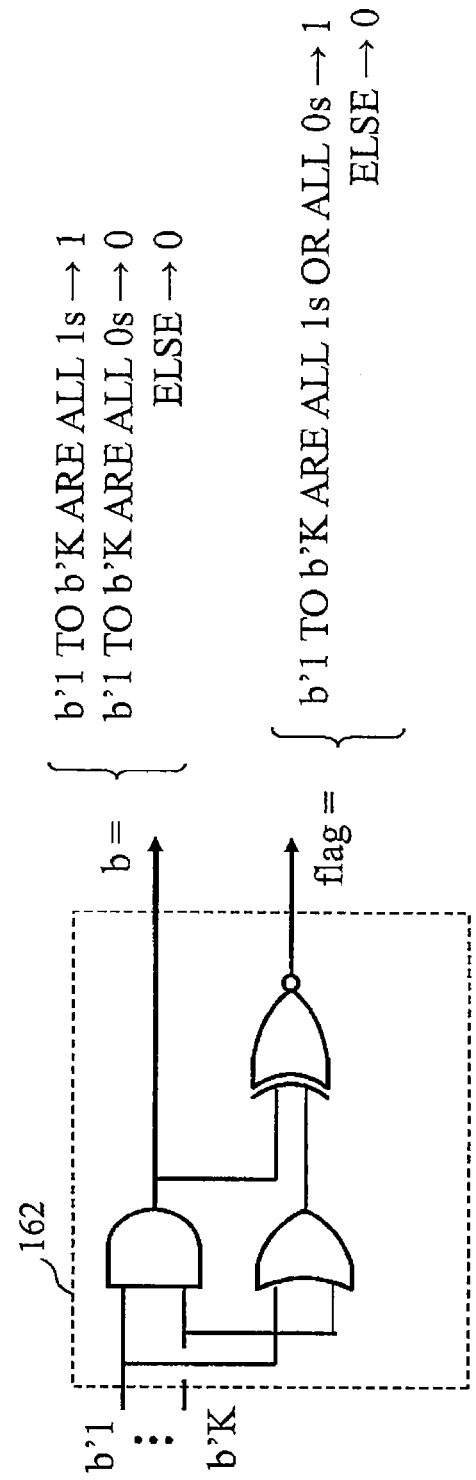
FIG. 11 shows another specific configuration of the generation bit stabilization circuit 160 according to the first embodiment.

FIGS. 10 and 11 show a generation bit stabilization circuit 161 and a generation bit stabilization circuit 162 as specific configurations of the generation bit stabilization circuit 160. The generation bit stabilization circuit 161 in FIG. 10 determines the bit of the bits of either 1 or 0 of the K bits generated by the respective unit circuits, which are generated more than the other, as the final output bit b1. In the case of the generation bit stabilization circuit 162 in FIG. 11, only when all the K bits generated by the respective unit circuits have the same value (1s alone or 0s alone), the bit is used as information.

When the K bits include both a 0 and a 1, the generation bit stabilization circuit 162 outputs a flag signal indicating that the output bit b1 is not used as information. Specifically, the generation bit stabilization circuit 162 outputs a flag signal (satisfaction information) indicating whether or not the output bit is used as information, simultaneously with the output bit b. This flag signal is a "mask" discussed later.

As for the control registers 140, the bit sequence generation circuit 100 includes the configuration shown in FIGS. 8 and 9, as a bit generation circuit based on the T-FF. When the bit sequence generation circuit 100 is provided with a function by which either the configuration of FIG. 8 or the configuration of FIG. 9 can be selected, the control registers 140 hold the selection signal. The selection signal is inputted from outside via the data bas 101.

An operation of the bit sequence generation circuit 100 is described with reference to FIGS. 12 and 13.

Figure 12:
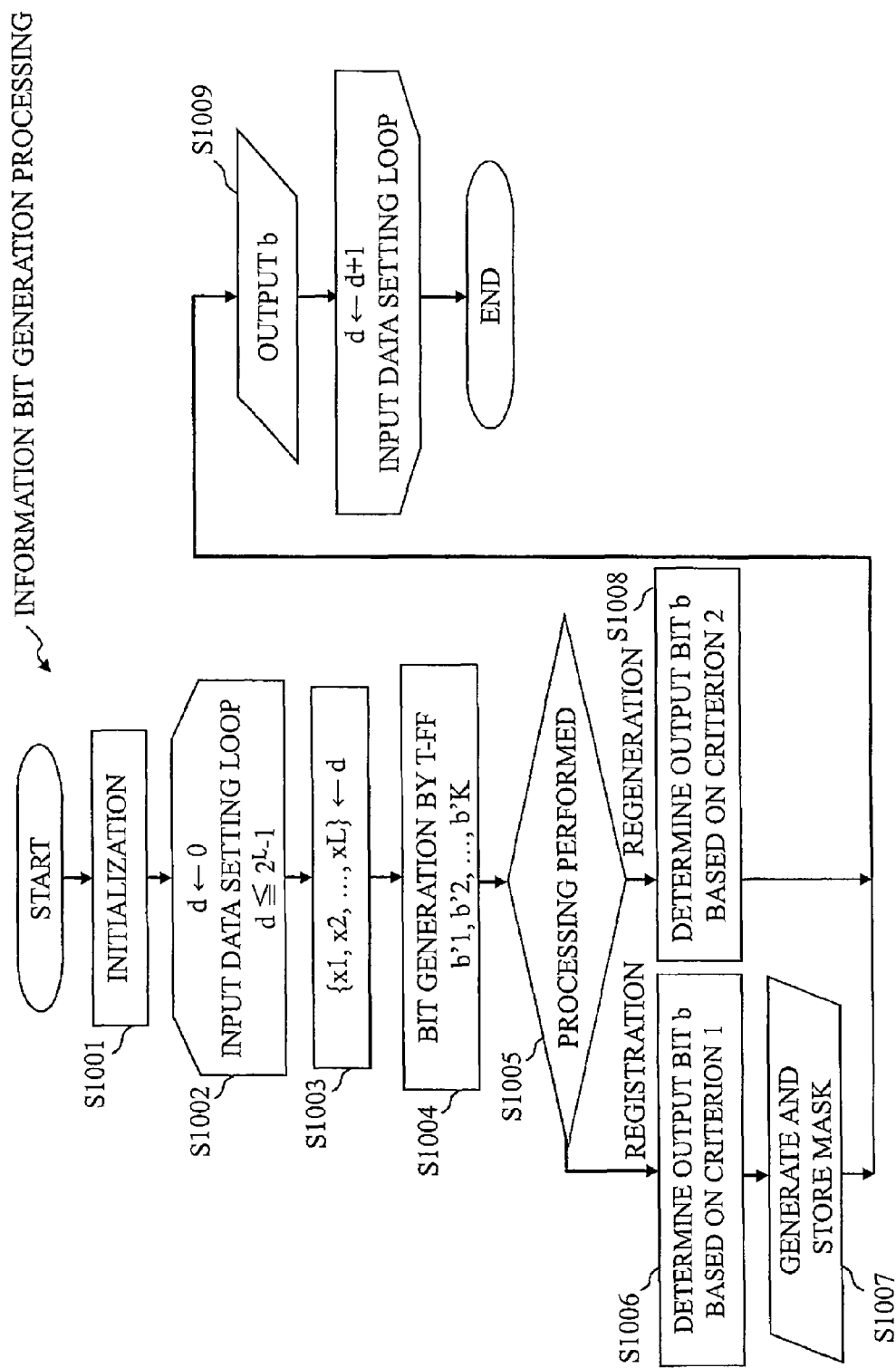
FIG. 12 is a flow chart illustrating an operation of the bit sequence generation circuit 100 according to the first embodiment.
Figure 13:
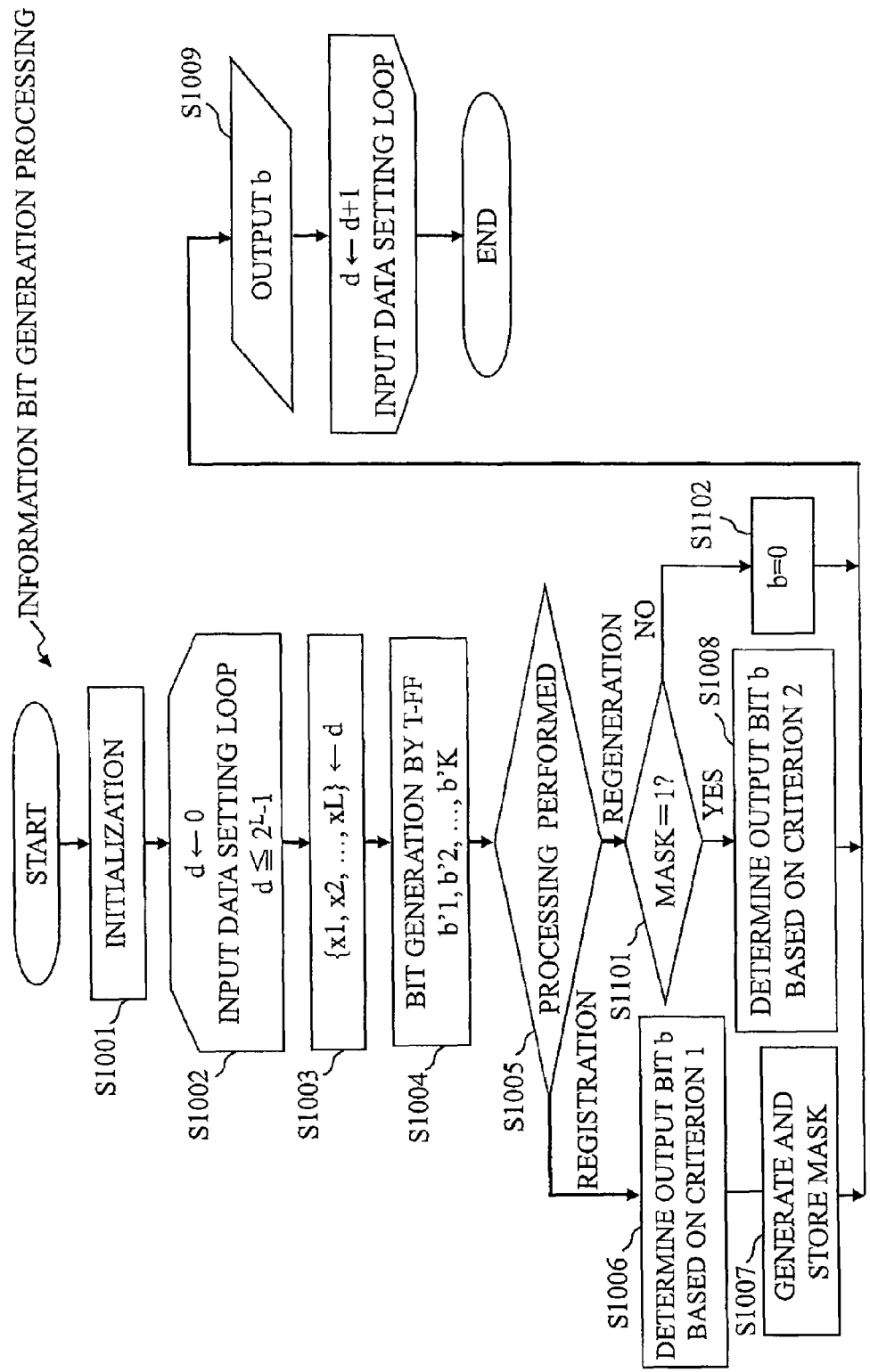
FIG. 13 is another flow chart illustrating an operation of the bit sequence generation circuit 100 according to the first embodiment.
Figure 14:
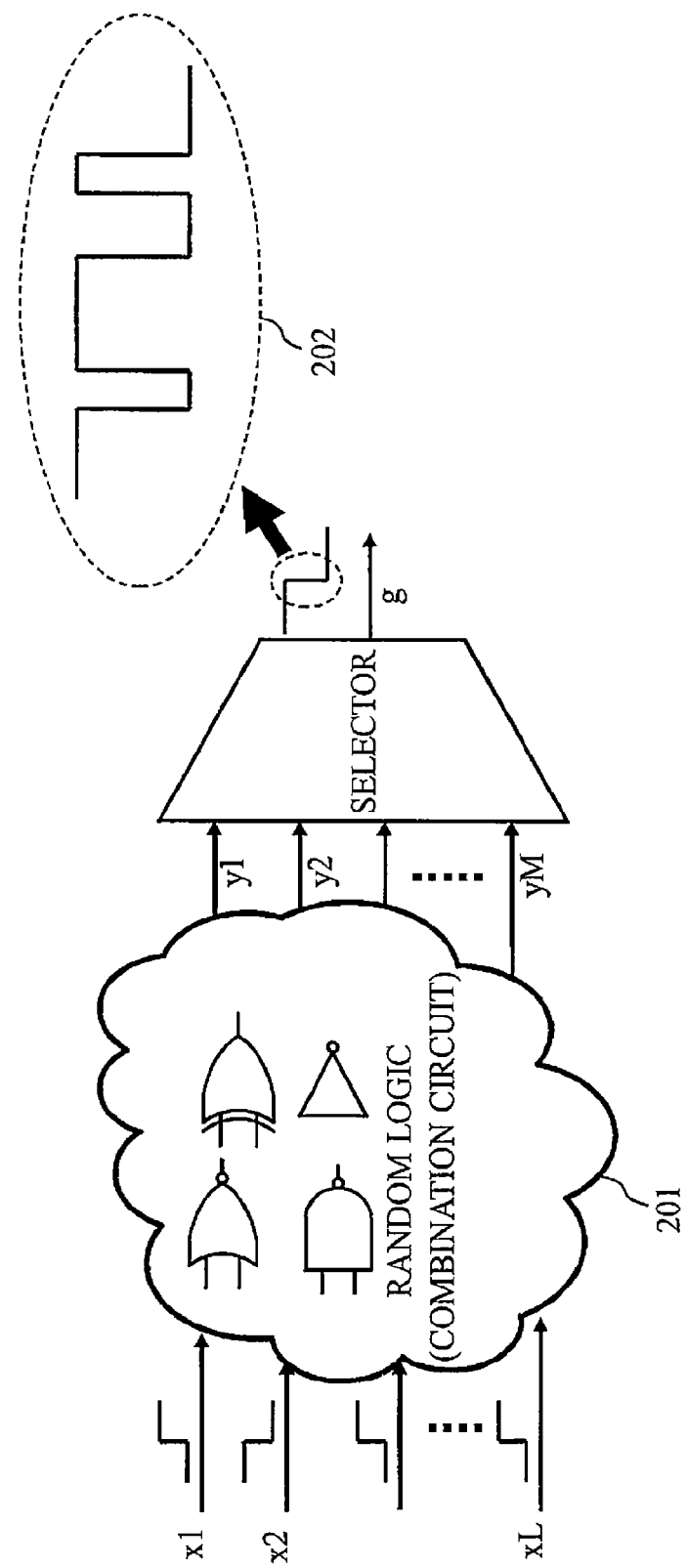
FIG. 14 shows conventional art.
Figure 15:
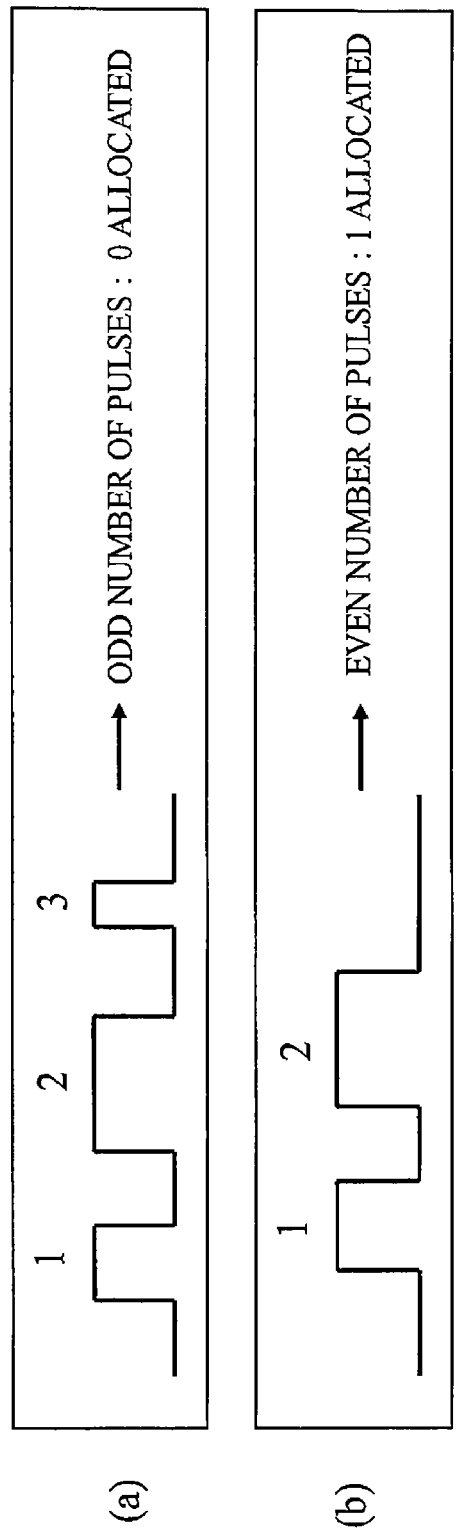
FIG. 15 shows conventional art.
Figure 16:
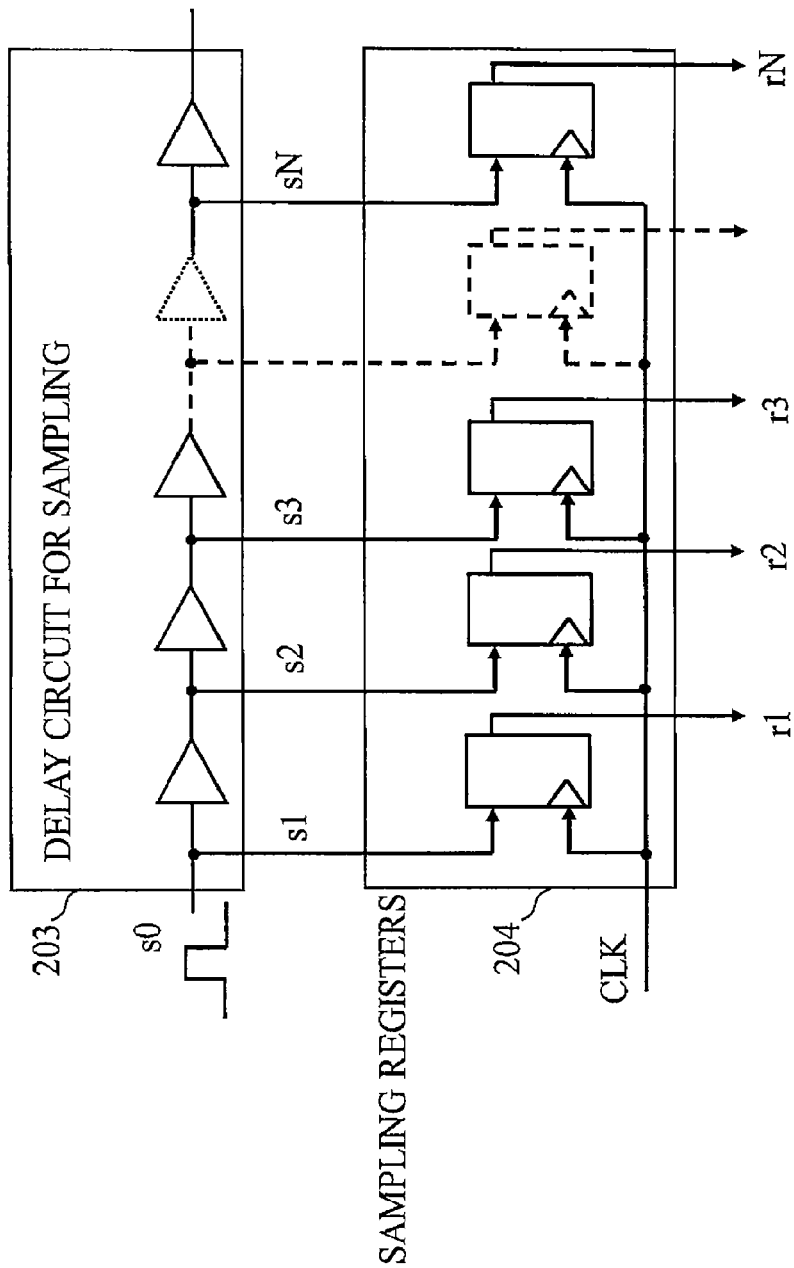
FIG. 16 shows conventional art.
Figure 17:
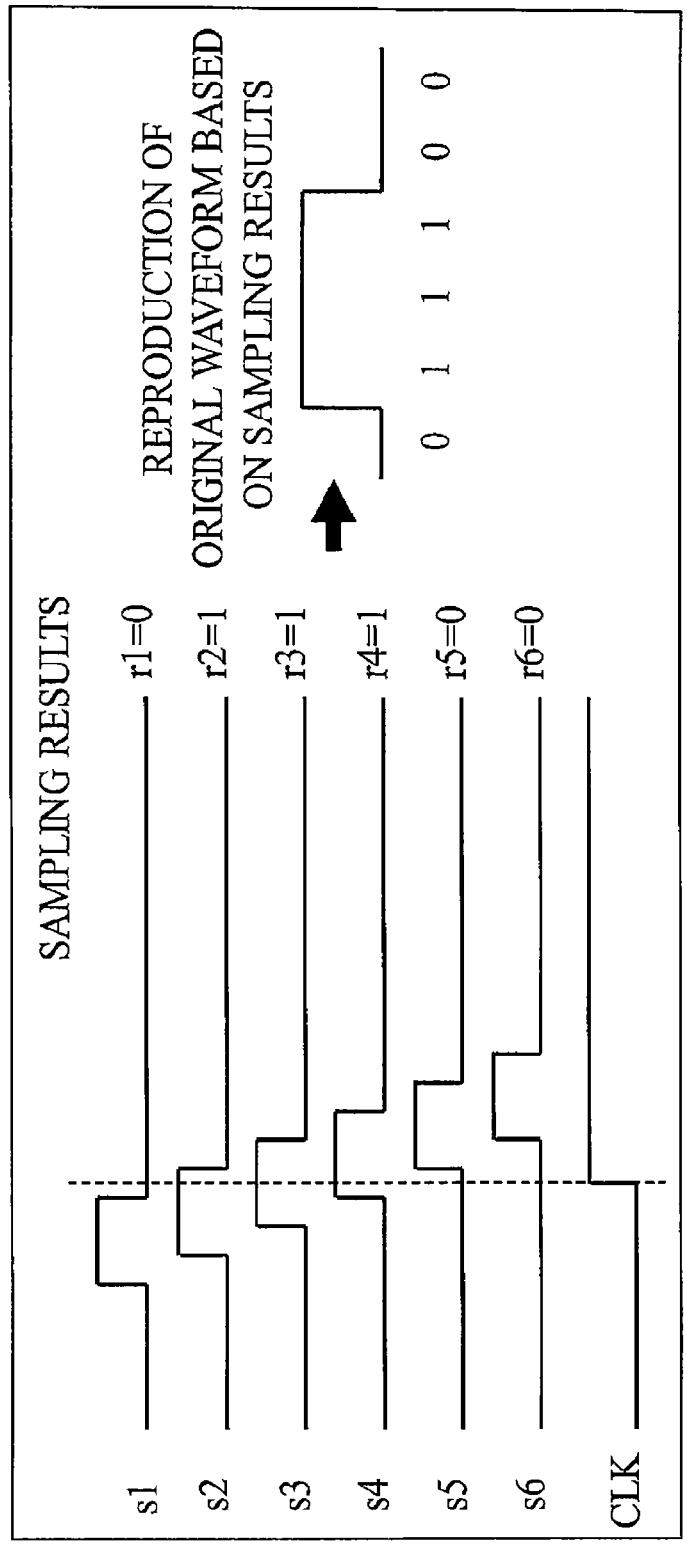
FIG. 17 shows conventional art.
Figure 18:
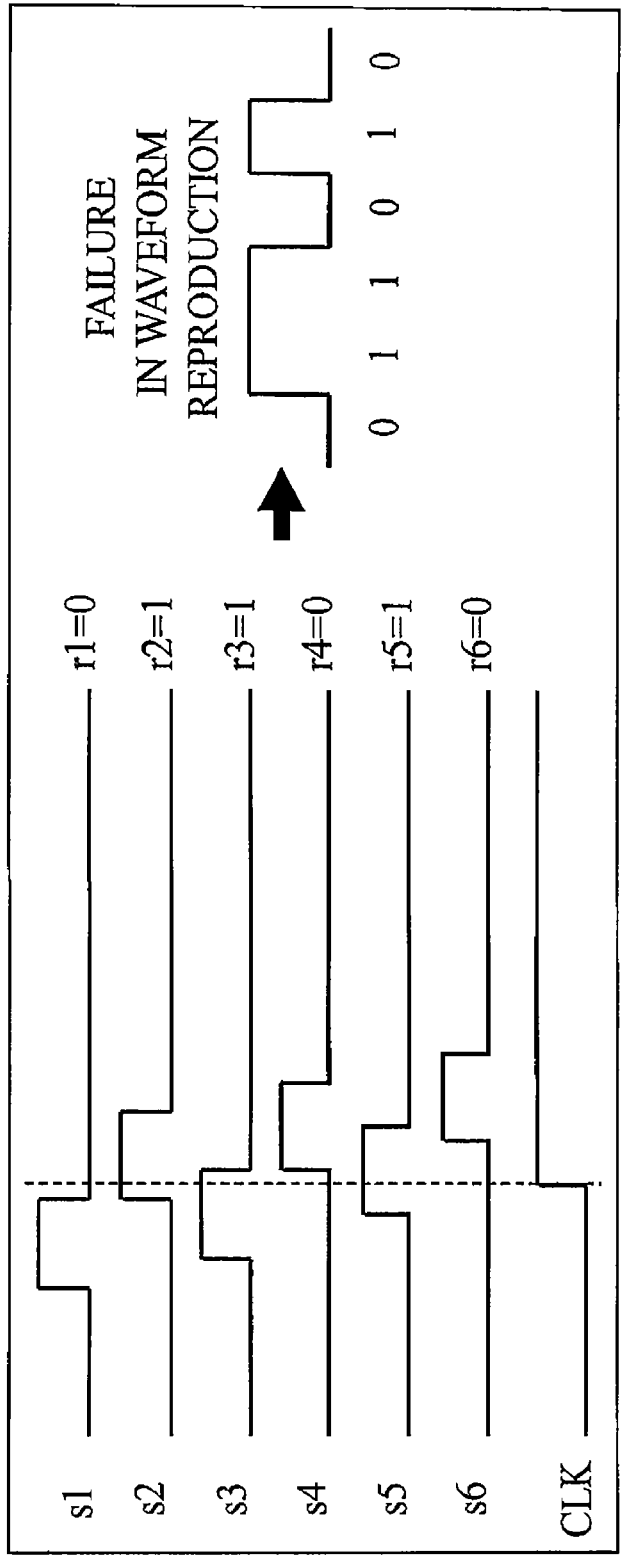
FIG. 18 shows conventional art.
Figure 19:
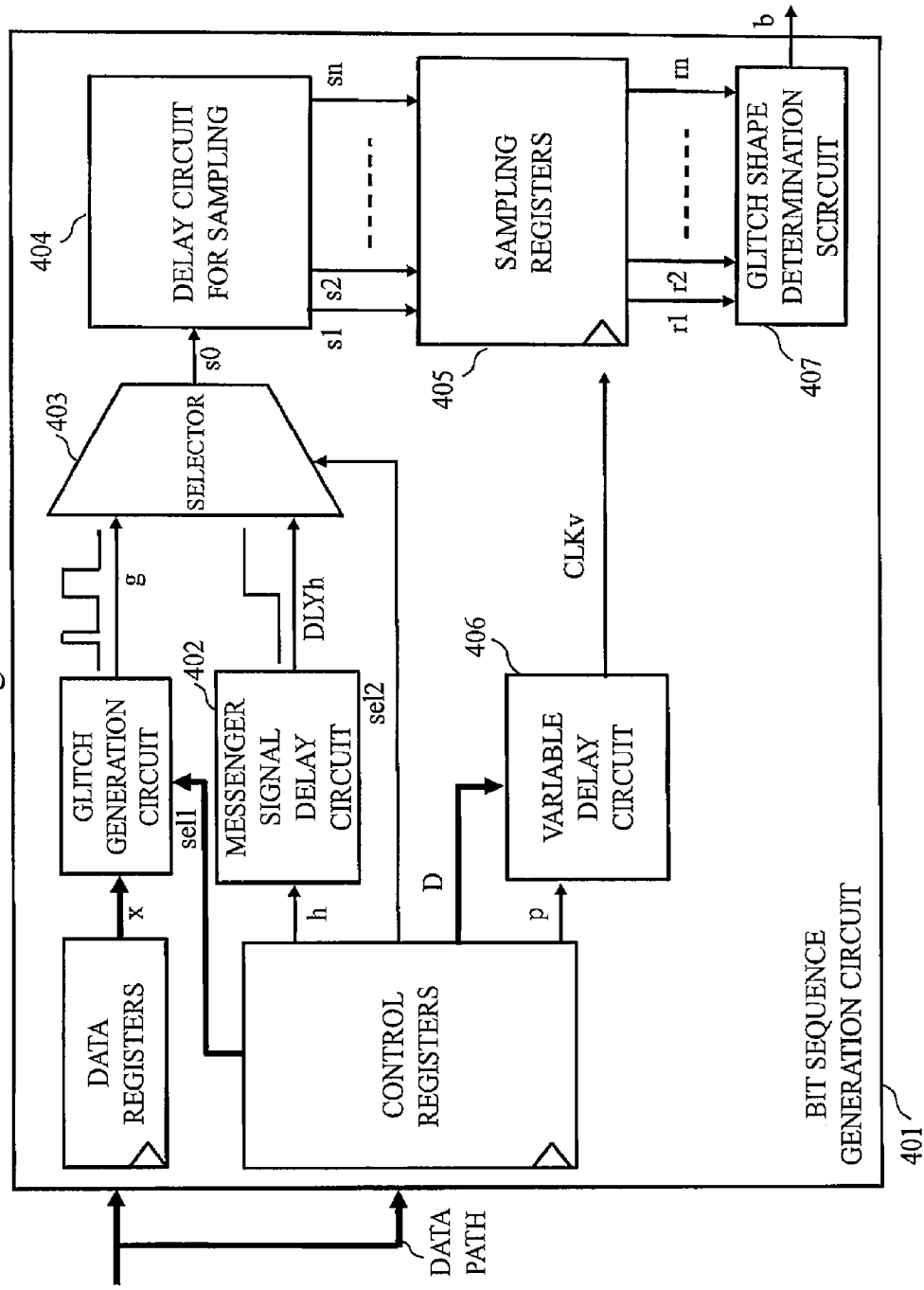
FIG. 19 shows conventional art.

FIGS. 12 and 13 are flow charts illustrating operations of information bits generation performed by the bit sequence generation circuit 100. In the operations illustrated in FIGS. 12 and 13 discussed below, the CPU 500 is assumed to control the bit sequence generation circuit 100.

First, FIG. 12 is described. In the following discussion, FIGS. 4 and 9, and others are referred to as well. First, as a default setting, all the registers in the bit sequence generation circuit 100 are initialized by the CPU 500 (S1001). After the initialization, the CPU 500 causes the data registers 110 to input data (S1002, S1003). In S1002, d is looped from d=0 until d=$2^{L-1}$. The loop of d, as shown in S1003, corresponds to $2^L$ kinds of input data of L bits (x1, x2, . . . xL)=(0, 0, . . . , 0) to (1, 1, . . . , 1). For example, d=0 corresponds to (x1, x2, . . . , xL)=(0, 0, . . . 0), that is, every bit of the L bits is 0, and d=$2^{L-1}$ corresponds to (x1, x2, . . . xL)=(1, 1, . . . 1), that is, every bit of the L bits is 1. Upon input of x1 to xL in S1003, the glitch generation circuit 120 outputs the glitch signals y1 to yM based on the inputs of x1 to xL.

The glitch signals y1 to yM generated by the glitch generation circuit 120 are processed by the bit generation circuits 130. Specifically, the glitch signal y1 to yM are processed by each of the T-FF bit generation circuits, 131(i), in FIG. 4. M information bits in total, that is, one bit for each of the glitch signals y1 to yM, are finally outputted to the data bus 102 by the bit generation circuits 130.

Steps S1004 to S1009 in FIG. 12 illustrate a flow of bit sequence generation. For a simple discussion in S1004 to S1009, it is assumed that one bit is to be generated. That is, the T-FF bit generation circuit 131(1) in FIG. 4 is exclusively referred to in S1004 to S1009, for example. The generation of M bits is implemented by parallel operations of M sets of the steps S1004 to S1009. That is, the T-FF bit generation circuits 131(1) to 131(M) perform operations in parallel. A description is given below of S1004 to S1009 which is assumed to be performed by the T-FF bit generation circuit 131(1).

S1004 is a step corresponding to the configuration shown in FIG. 9. S1004 is provided for the stabilization of bit generation. The K T-FFs (unit circuits) generate K bits b'1 to b'K for the glitch signal y1 generated by the glitch generation circuit 120. Since "b'1 to b'K" are bits generated from the same glitch signal y1, it is ideal that they have the same value. In practice, however, the bit values are likely to differ from one another on a device, according to the wire through which the signal travels to reach each T-FF (unit circuit), or the innate characteristics of each T-FF. In other words, when all the values of "b'1 to b'K" are the same, the bit can be said to be stable. Generally, the bit value that outnumbers the other (more than K/2) of the generated K bit values can be regarded as the right bit value. It can be said that the higher the degree of correspondence (as the number of bits of either 0 or 1 approaches the total K), the more stable the bit.

In S1005, the processing is divided for registration and regeneration which use different criteria for bit generation. "Registration" denotes when a generated bit sequence is registered as key information in a different device, and such, which is usually done at the first generation of information bits. A generation after registration or each subsequent generation (usually, second or subsequent generation) is denoted as "Regeneration". For example, "registration" is a process performed by a manufacturer who produces devices with the bit sequence generation circuit 100 built therein, for storing key information (bit sequence). "Regeneration" denotes when a device with the bit sequence generation circuit 100 built therein is purchased by a user and then keys information is generated, for example.

(Registration)

S1006 and S1007 are steps at registration. In S1006, the generation bit stabilization circuit 160 determines the output bit b1 in accordance with a "criterion 1". In S1007, the generation bit stabilization circuit 160 outputs a "mask" (flag signal described above) representing the stability of the output bit b1. In S1008 discussed later, the generation bit stabilization circuit 160 determines the output bit b1 in accordance with a "criterion 2". The "criterion 1" is more strict than the "criterion 2" in S1008.

(Masking)

The mask generated at registration is described below. The b1 outputted as the representative bit of the K bits by the generation bit stabilization circuit 160 in FIG. 9 is the bit value of the bit values whose generated number is at least more than K/2. However, if the number is barely over K/2, the bit values may be outnumbered by the other bit values at regeneration, which shows low stability. If the bit that satisfies a more strict condition, that is, the bit of the bit values whose generated number is close to the total K, is used exclusively as the information bit b1, the stability of bit generation can be improved. In other words, when the bit values of either 0 or 1 of K bit values "b'1 to b'K" generated by the K unit circuits satisfy a predetermined proportion, the generation bit stabilization circuit 160 converts the K bit values into the bit value of the bit values that satisfy the predetermined proportion, as the representative bit. The generation bit stabilization circuit 160 generates the "mask" (flag signal described above) as information indicating whether or not the predetermined proportion is met. Here, the "predetermined proportion" may be "100%" or "90%" as described with reference to FIG. 11. The "predetermined proportion" can be set arbitrarily. Thus, the generation bit stabilization circuit 160 outputs information indicating that the output bit b1 is the bit that satisfies the "strict condition", as the mask (satisfaction information). This allows the CPU 500 to determine whether to use the bit b1 or not. The "strict condition" is when all the K bit values "b'1 to b'K" are the same as described above, for example.

(Regeneration)

S1008 is a step at regeneration. At regeneration, the generation bit stabilization circuit 160 determines the output bit b1 (representative bit) in accordance with the "criterion 2". The "criterion 2" may either be the same or different from the "criterion 1". However, under the condition that all the K bit values be the same, the bit value cannot be determined unless all the bit values match. Accordingly, that condition is excluded. Usually, the "criterion 2" is more moderate than the "criterion 1". For example, the "criterion 1" is like "perfect matching" shown in FIG. 11 while the "criterion 2" is like "majority" shown in FIG. 10. Thus, in S1008, the generation bit stabilization circuit 160 outputs the representative bit b1 shown in FIG. 9 in accordance with the "criterion 2".

As for FIG. 12, the processing is assumed to be an upper routine process in which information bit generation is used as a subroutine, and such. FIG. 12 shows a processing only for generating a mask and storing the mask (S1007). The processing of determining whether to use the output bit b accompanied by a mask is performed by a higher routine based on the mask.

FIG. 13 shows when the processing using the mask is included in information bit generation. FIG. 13 modifies FIG. 12 by adding steps S1101 and S1102. In S1101, the processing is divided according to the value of the mask. In FIG. 13, when the value of the mask is "1", the bit b is used. When the mask is "1", then the bit b (representative bit) is determined in accordance with the "criterion 2" in the same manner as that shown in FIG. 12 (S1008). When the mask is 0, the value of the bit b1 is not used as the information bit. Consequently, if b=0 is determined instantly by omitting the determination process in accordance with the criterion 2, then the processing can be speeded up. Since this value is not used, the same is true with b=1.

Specifically, the T-FF bit generation circuits 131(1)-1 to 131(1)-K input the glitch signal y1 (second glitch signal) generated by the glitch generation circuit 120 based on the same input signals as the input signals (x1 to XL) which correspond to the glitch signal y1 as the generation source of the mask generation (S1007), from the glitch generation circuit 120 via the different signal lines as shown in FIG. 9, The T-FF bit generation circuits 131(1)-1 to 131(1)-K generate the bits b'1 to b'K (second bit values) based on the inputted glitch signal (second glitch signal). The generation bit stabilization circuit 160 refers to the mask stored in a storage unit such as the internal memory 600. When the mask is "1" (when the mask indicates a satisfaction at the predetermined proportion), the generation bit stabilization circuit 160 determines whether the bit values of either 0 or 1 of the K bit values satisfy the criterion 2 which is more moderate than the criterion 1. When the criterion 2 is determined to be satisfied, the generation bit stabilization circuit 160 converts the K bit values into the bit value (representative value) which is the bit value into which the bit values are to be converted in accordance with the criterion 2.

In S1009 in FIG. 12 and FIG. 13, the generated bit b is outputted. The aforementioned process is repeated with each bit of the input data "x1 to xL" (S1002 loop). The configuration of the bit sequence generation circuit 100 in FIG. 4 enables a parallel generation of M bits.

Consequently, M×2L bits, i.e., b1(d) to bM(d) (d=0, 1, . . . 2L−1), are finally outputted. Among the final outputs, a portion indicated by the mask (flag signal) at S1007 is utilized as device unique information.

The bit sequence generation circuit 100 of the first embodiment allows circuits that are conventionally required but not essential for glitch PUF, to become unnecessary, thereby preventing expansion in circuit scale and increase in processing time. This results in solving the problem of reduction in the number of simultaneously generable bits.

The comparison between the conventional bit sequence generation circuit 401 and the bit sequence generation circuit 100 of the first embodiment shows that the circuits and registers for sampling and sorting required for the conventional glitch PUF are not required in the bit sequence generation circuit 100, thereby achieving the effect of reduction in circuit scale. The number of control registers is reduced as well.

As for the processing performance of the bit sequence generation circuit 100, as a result of reduction in required processing, processing speed is improved, and as a result of reduction in circuit scale, multiple bits can be generated simultaneously.

As for bit generation, instead of processing sampling data in the glitch shape, the simple processing of bit inversion by T-FFs is used.

This enables the processing of stabilization of bit generation to be preformed by hardware on a small-scale circuit such as those shown in FIGS. 8, 10 and 11. This also helps achieve the effect of improving processing speed.

Thus, in this embodiment, the bit sequence generation circuit 100 has been described as an apparatus. Alternatively, however, operations performed by the respective components of the bit sequence generation circuit 100 can be interpreted in a bit generation method for generating bits from glitch signals.

REFERENCE SIGNS LIST 100 bit sequence generation circuit
101, 102 data bus
110 data registers
120 glitch generation circuit
121 random logic section
130 bit generation circuits
131 T-FF bit generation circuit
131(1)-1 T-FF bit generation circuit
140 control registers
150, 151 filter circuit
160, 161, 162 generation bit stabilization circuit
1000 system LSI

The invention claimed is:

1. A bit generation apparatus comprising:
a glitch generation section that generates a glitch signal including a plurality of pulses;
a filter section configured to include series-connected N semiconductor devices from a first semiconductor device to an N-th semiconductor device, N being an integer of two or more, the filter section being configured to
input only via the first semiconductor device the glitch signal generated by the glitch generation section,
remove a pulse whose width is less than a predetermined pulse width, by allowing the inputted glitch signal to pass through the first semiconductor device to the N-th semiconductor device, and
output only via the N-th semiconductor device the glitch signal from which the pulse whose width is less than the predetermined pulse width has been removed; and
a bit value generation section that inputs the glitch signal outputted by the filter section, and generates a bit value of 0 or 1 based on rising edges or falling edges of the plurality of pulses included in the inputted glitch signal.

2. The bit generation apparatus according to claim 1, wherein the filter section is configured to include series-connected NOT gates, a first NOT gate to an N-th NOT gate, as the N semiconductor devices.

3. The bit generation apparatus according to claim 1, wherein the bit value generation section includes:
a plurality of bit value generation sections that input from the filter section via different signal lines a same glitch signal outputted by the filter section, and generate a plurality of bit values based on the inputted glitch signal; and
a conversion section that based on a number of 0s and the number of 1s indicated by the plurality of bit values generated by the plurality of bit value generation sections, converts the plurality of bit values into a representative bit value indicating a value of 0 or 1.

4. The bit generation apparatus according to claim 3, wherein when bit values of 0 or 1 of the plurality of bit values generated by the plurality of bit value generation sections meet a predetermined proportion, the conversion section converts the plurality of bit values into one of bit values of 0 or 1 that meet the predetermined proportion, as the representative bit value.

5. The bit generation apparatus according to claim 4, wherein:
the glitch generation section inputs input signals for generating the glitch signal, and generates the glitch signal corresponding to the input signals inputted;
the filter section inputs via the first semiconductor device the glitch signal generated by the glitch generation section, and outputs via the N-th semiconductor device the inputted glitch signal;
each of the plurality of bit value generation sections inputs from the filter section via a different signal line from others the same glitch signal outputted by the filter section, and generates a bit value based on the inputted glitch signal; and
the conversion section converts the plurality of bit values into the representative bit value indicating the value of 0 or 1 based on the number of 0s and the number of 1s indicated by the plurality of bit values generated by the plurality of bit value generation sections, generates satisfaction information indicating whether bit values of 0 or 1 meet the predetermined proportion, and stores the generated satisfaction information in a storage unit; and
wherein:
the glitch generation section inputs the input signals which are the same signals as the input signals based on which the glitch signal has been generated as a source of generation of the plurality of bit values for which the satisfaction information has been generated, and generates a second glitch signal which is the glitch signal corresponding to the input signals inputted;
the filter section inputs via the first semiconductor device the second glitch signal generated by the glitch generation section, and outputs via the N-th semiconductor device the inputted second glitch signal;
each of the plurality of bit value generation sections inputs from the filter section via the different signal line from others the second glitch signal outputted by the filter section, and generates a second bit value as the bit value based on the inputted second glitch signal; and
the conversion section refers to the satisfaction information stored in the storage unit;
when the satisfaction information indicates a satisfaction at the predetermined proportion, determines whether bit values of 0 or 1 of second bit values meet a predetermined lower proportion than the predetermined proportion; and when the predetermined lower proportion is determined to be met, converts the second bit values into the bit value of the bit values determined to meet the predetermined lower proportion, as the representative bit value.

6. The bit generation apparatus according to claim 5, wherein the conversion section generates the satisfaction information indicating whether bit values of 0 or 1 meet a proportion of more than 50%.

7. The bit generation apparatus according to claim 1, wherein the bit value generation section inputs the glitch signal outputted by the filter section, and generates the bit value of 0 or 1 based on a parity of the number of rising edges of the plurality of pulses included in the inputted glitch signal, the bit generation apparatus comprising:
a toggle flip-flop circuit as the bit generation section, which outputs the bit value of 0 or 1 based on the parity of the number of rising edges of the plurality of pulses included in the inputted glitch signal.

8. A bit generation method performed by a bit generation apparatus including a glitch generation section, a filter section and a bit value generation section, the method comprising:
generating, in the glitch generation section, a glitch signal including a plurality of pulses;
inputting, only via a first semiconductor device of the filter section, the glitch signal generated by the glitch generation section, the filter section including series-connected N semiconductor devices from the first semiconductor device to an N-th semiconductor device, N being an integer of two or more,
removing, in the filter section, the pulse whose width is less than a predetermined pulse width by allowing the inputted glitch signal to pass through the first semiconductor device to the N-th semiconductor device, and
outputting, from the filter section, only via the N-th semiconductor device the glitch signal from which the pulse whose width is less than the predetermined pulse width has been removed; and
inputting, in the bit value generation section, the glitch signal outputted by the filter section, and
generating, by the bit value generation section, a bit value of 0 or 1 based on rising edges or falling edges of the plurality of pulses included in the inputted glitch signal.

* * * * *